(12) United States Patent
Baziuk

(10) Patent No.: US 7,846,331 B2
(45) Date of Patent: Dec. 7, 2010

(54) MATERIAL SEPARATION SYSTEM FOR VACUUM TRUCK

(76) Inventor: Slawko Morris Baziuk, 1900 Brookside Blvd. R.R.#2, Winnipeg Manitoba (CA) R3C 2E6

( * ) Notice: Subject to any disclaimer, the term of this patent is extended or adjusted under 35 U.S.C. 154(b) by 109 days.

(21) Appl. No.: 12/334,620

(22) Filed: Dec. 15, 2008

(65) Prior Publication Data

US 2010/0147753 A1    Jun. 17, 2010

(51) Int. Cl.
*B01D 21/24*    (2006.01)
(52) U.S. Cl. .................. 210/241; 210/305; 210/532.1; 15/340.1; 15/353
(58) Field of Classification Search .............. 210/131, 210/188, 241, 305, 521, 532.1, 499; 15/340.1, 15/353
See application file for complete search history.

(56) References Cited

U.S. PATENT DOCUMENTS

| | | | | |
|---|---|---|---|---|
| 3,463,172 A * | 8/1969 | Naylor | ........................ | 210/241 |
| 4,016,994 A | 4/1977 | Wurster | | |
| 4,134,174 A * | 1/1979 | Flynn et al. | ................... | 15/353 |
| 4,199,837 A * | 4/1980 | Fisco, Jr. | ................... | 15/340.1 |
| 4,377,475 A * | 3/1983 | Wiedemann | ................ | 210/241 |
| 4,389,314 A * | 6/1983 | Petretti | ........................ | 210/241 |
| 4,816,167 A * | 3/1989 | Vanderslice | .................. | 210/241 |
| 4,904,126 A | 2/1990 | Voith | | |
| 5,021,156 A * | 6/1991 | Sloan | ......................... | 210/241 |
| 5,295,317 A | 3/1994 | Perrott | | |
| 5,503,753 A * | 4/1996 | Woodall et al. | ............. | 210/241 |
| 5,720,885 A * | 2/1998 | Moos | ......................... | 210/241 |
| 5,722,113 A | 3/1998 | Baziuk | | |
| 6,453,584 B1 | 9/2002 | Buckner | | |
| 6,604,304 B1 | 8/2003 | Slabach | | |
| 7,699,978 B2 * | 4/2010 | Dyer | .......................... | 210/131 |
| 2006/0236498 A1 * | 10/2006 | Nuhn | ......................... | 15/340.1 |

* cited by examiner

Primary Examiner—Christopher Upton
(74) Attorney, Agent, or Firm—Adrian D. Battison; Ade & Company

(57) ABSTRACT

A vacuum truck has a cylindrical tank which can be pivoted to discharge through a rear door is arranged for transporting collected solids while liquid is extracted and returned. Two tank extraction outlets in the top wall at the front and rear are connected to the vacuum pump and each includes a float valve ball contained in a receptacle above the top wall as to allow the tank to be filled to the top wall. For separating the materials into liquid which is pumped away and solids for transportation, the tank includes a generally upstanding dividing wall across the tank having a bottom wall portion, which can pivot away as the tank is tilted, and has a top edge defining a weir over which liquid can flow into the liquid collection area, and an upper screening section defined by a support screen and a hanging chain curtain in front of the screen.

21 Claims, 3 Drawing Sheets

MATERIAL SEPARATION SYSTEM FOR VACUUM TRUCK

This invention relates to a vacuum truck for vacuum extraction to a storage tank of liquids and solids from an area to be cleaned, which uses a separation system within the storage tank to remove liquid content from solids content so as to allow the liquid to be returned to the area and to increase the amount of available transportation area within the tank for the solids to be transported to a remote location.

BACKGROUND OF THE INVENTION

Vacuum trucks are well-known and widely used for excavation or extraction of particulate material by vacuum from an area to be cleared, with the material collected being transported through a vacuum hose into a storage tank from which the material is separated from the air before the air enters the vacuum pump.

Such vacuum trucks are commonly used for clearing pipes and other areas where a collection of solid material needs to be extracted from an area containing water. Thus a blocked sewer or drainage pipe contains water which can be returned to the pipe and a quantity of solids which must be removed.

One problem which arises with vacuum trucks of this type is that it is desirable to increase as far as possible the amount of solids which can be collected so as to transport as much as possible of the material which must be removed while returning liquid to the area being cleaned. It will be appreciated that to maximize the amount of material carried in a load reduces the number of loads which must be transported with the potential of significantly reducing total working time to clear a particular area or blockage.

U.S. Pat. No. 5,722,113 (of the present inventor Baziuk) issued Mar. 3, 1998 shows an arrangement for collecting dust and moisture where separate collection tanks are provided on each side of the tank and contain hanging chains which form a screen. There is no disclosure of separation of liquid and solids within the tank.

U.S. Pat. No. 4,016,994 (Wurster) issued Apr. 12, 1977 shows a two tank system for collecting air transportable material which may be wet or dry but does not act to separate the wet from the dry.

U.S. Pat. No. 4,904,126 (Voith) issued Feb. 27, 1990 shows a vacuum truck for collecting primarily dry material which uses filter cartridges to separate the particulate materials from the air.

U.S. Pat. No. 6,453,584 (Buckner) issued Sep. 24, 2002 shows an arrangement in which the collected materials and separated into liquid and solids components using a vibrating screen onto which the material is deposited with the liquid falling through into a separate container. The materials are continually discharged so that the tank is not required as a transport container, thus allowing the separation system to take up a significant part of the tank.

U.S. Pat. No. 6,604,304 (Slabach) issued Aug. 12, 2003 shows a vacuum system with a slurry tank for transporting the extracted slurry material. There is no attempt to separate the liquid and solids content so that the total of the slurry needs to be transported.

U.S. Pat. No. 5,295,317 (Perrott) issued Mar. 2, 1994 shows an excavation machine in which the collected materials and separated into liquid and solids components using a rotating screen. The materials are continually discharged so that the tank is not required as a transport container, thus allowing the separation system to take up a significant part of the tank.

SUMMARY OF THE INVENTION

It is one object of the invention to provide an improved vacuum truck where there is provided a separation system within a transportation and storage tank to remove liquid content from solids content so as to allow the liquid to be returned and to increase the amount of available transportation area within the tank for the solids to be transported to a remote location.

According to one aspect of the invention there is provided a vacuum truck comprising:

a truck frame mounted on ground wheels;

a vacuum pump mounted on the truck frame for generating an air flow through the pump to form a vacuum inlet on one side of the pump and an air outlet on an opposed side of the pump;

a vacuum hose having an inlet nozzle for communicating air flow from a material to be vacuumed to carry the material in the air flow to a hose outlet;

a storage tank having a tank inlet connected to the hose outlet of the vacuum hose for receiving the material carried in the air flow;

at least one tank extraction outlet connected by a duct to the vacuum inlet of the pump such that air flow is drawn from the tank by the vacuum pump through the duct which generates the air flow in the vacuum hose to carry the material;

the tank being arranged such that the materials carried in the airflow are discharged from the airflow as the airflow passes through the tank from the vacuum hose to the tank extraction outlet;

the tank including a separation system therein for separating the materials generally into a liquid component and a solids component;

a liquid pump mounted in the tank for extracting the separated liquid component from the tank to increase a storage capacity of the tank for the solids component to be collected and transported in the tank on the truck to a remote location for discharge;

a discharge door at one end of the tank for discharging the collected solids component;

a lifting arrangement for tilting the tank so as to discharge the collected solids component through the discharge door;

the separation system including a generally upstanding dividing wall across the tank dividing a solids collection area on one side from a liquid collection area on the other side, with the solids collection area being located adjacent the discharge door, with the water pump having an inlet located in the liquid collection area and with the tank inlet located in the solids collection area;

the dividing wall having a bottom wall portion, which is substantially imperforate and has a top edge defining a weir over which liquid can flow into the liquid collection area, and an upper screening section, which is perforated to allow the liquid to pass over the top edge into the liquid collection area while restricting passage of the solids.

Preferably the upper screening section extends from the top edge to a top wall of the tank to allow the tank to be filled to the top wall with the solids.

Preferably the upper screening section includes a hanging curtain formed by a series of side by side lengths of chain. Such hanging chain lengths are self cleaning and resistant to damage from heavy components in the solids.

Preferably the lengths of chain are connected only at a top end so that the other end of each length is free and the length is suspended vertically with the other end of the lengths in contact with or closely adjacent the top edge of the bottom wall portion.

Preferably the upper screening section includes a perforated screen support on the side of the curtain which is within the liquid collection area to prevent the curtain from being forced into the liquid collection area by the weight of collection of solids within the solids collection area and thus to hold the solids in the solid collection area.

Other types of screening section can be used but the chains are particular effective in that they are rugged and resistant to damage and self cleaning.

The separating action is relatively crude since some solids can enter the liquid area without causing a breakdown, blockage or damage. However the intention is to extract as much water as is reasonably possible with a simple rugged system so as to increase the amount of solids contained.

Preferably the bottom wall portion is mounted for pivotal movement about a horizontal axis at or adjacent the top edge so as to pivot during tilting of the tank to open and allow discharge of materials collected at a bottom of the liquid collection area. Also any liquid collecting behind the bottom portion which acts as a door can flow over the bottom of the tank in a cleaning action to help wash away any remaining solids at the bottom of the tank Preferably the pivotal bottom wall portion or door reaches substantially to a bottom wall of the tank so that effectively all material at the bottom wall can discharge by flowing over the bottom of the tank when the tank is tilted. Any water remaining at the bottom of the water collection area can be used to rinse the remaining solids from the tan.

Preferably there is provided a back-stop to prevent pivotal movement of the bottom wall portion or door in the reverse direction into the liquid collection area caused by the weight of solids collected in the solids collection area and resting against the door.

Preferably the liquid pump is mounted in the liquid collection area with its inlet in a caged area inside the liquid collection area and below the top edge.

Preferably the tank extraction outlet or outlets and the tank inlet are mounted at a top of the tank so as to allow the tank to be filled substantially to the top.

Preferably the tank extraction outlets include a first tank extraction outlet in the liquid collection area mounted at an end of the tank remote from the discharge door and a second tank extraction outlet in the solids collection area mounted adjacent the discharge door.

Preferably the or each tank extraction outlet includes a float valve comprising a float ball contained in a cage which is free to be floated upwardly by liquid to engage a valve seat to prevent passage of liquid into the duct to the vacuum pump and the valve seat is located in a receptacle for the float ball located above a top wall of the tank so as to allow the tank to be filled substantially to the top wall.

Preferably the cage for the float ball is formed from row of chains.

According to a second aspect of the invention there is provided a vacuum truck comprising:

a truck frame mounted on ground wheels;

a vacuum pump mounted on the truck frame for generating an air flow through the pump to form a vacuum inlet on one side of the pump and an air outlet on an opposed side of the pump;

a vacuum hose having an inlet nozzle for communicating air flow from a material to be vacuumed to carry the material in the air flow to a hose outlet;

a storage tank having a tank inlet connected to the hose outlet of the vacuum hose for receiving the material carried in the air flow;

at least one tank extraction outlet connected by a duct to the vacuum inlet of the pump such that air flow is drawn from the tank by the vacuum pump through the duct which generates the air flow in the vacuum hose to carry the material;

the tank being arranged such that the materials carried in the airflow are discharged from the airflow as the airflow passes through the tank from the vacuum hose to the tank extraction outlet;

the tank including a separation system therein for separating the materials generally into a liquid component and a solids component;

a liquid pump mounted in the tank for extracting the separated liquid component from the tank to increase a storage capacity of the tank for the solids component to be collected and transported in the tank on the truck to a remote location for discharge;

a discharge door at one end of the tank for discharging the collected solids component;

a lifting arrangement for tilting the tank so as to discharge the collected solids component through the discharge door;

wherein said at least one tank extraction outlet and the tank inlet are mounted at a top of the tank so as to allow the tank to be filled substantially to the top;

wherein said at least one tank extraction outlet includes a float valve comprising a float ball contained in a cage which is free to be floated upwardly by liquid to engage a valve seat to prevent passage of liquid into the duct to the vacuum pump;

and wherein the valve seat is located in a receptacle for the float ball located above a top wall of the tank so as to allow the tank to be filled substantially to the top wall.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
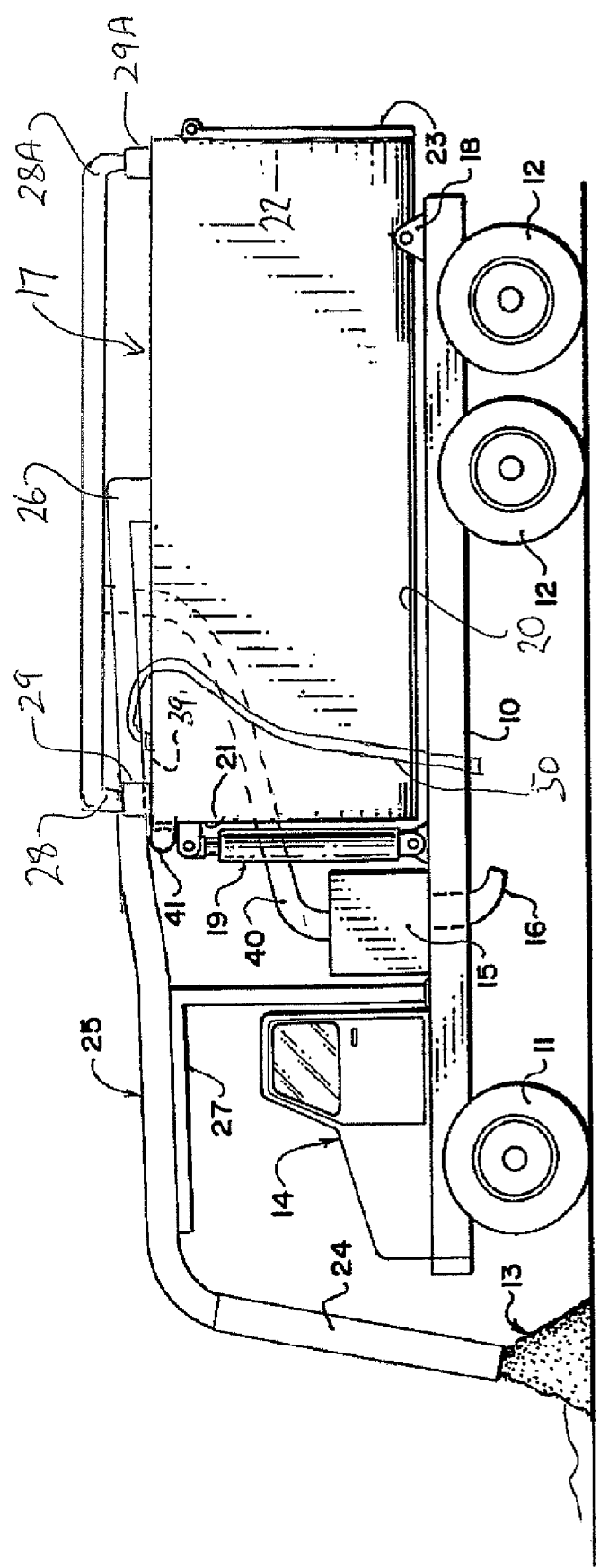
FIG. 1 is a side elevational view of a vacuum truck according to the present invention.

The vacuum truck of FIG. 1 comprises a truck frame 10 mounted on ground wheels 11 and 12 for movement across the ground for transporting the vacuum system from place to place for effecting excavation or extraction of materials 13 from a location to be removed. The materials commonly include a quantity of solids and liquid. Typically the vacuum truck is used to clear a blockage in a drain or culvert and hence it is necessary to remove both solid material 13 and liquid, generally water 13A, surrounding or mixed with the solids.

The frame of the truck including a cab 14 and drive systems is entirely conventional and therefore will not be described in detail herein. The truck carries a vacuum pump 15 again of a conventional nature of the type which generates a high level of vacuum and high air throughput. Such pumps are well-known and are conventionally available and include a discharge duct 16 for disposal.

The system further includes a material storage tank and separation system generally indicated at 17 all of which are mounted as a common structure on rear hinges 18 adjacent the rear of the frame 10 so that the tank and separation system can be tilted about a horizontal axis defined by the hinges 18 by a front lift cylinder 19. Again the hinges and cylinder are of a conventional nature and readily available from various manufacturers. The lift cylinder can effect tilting of the main storage tank and separation system to a height sufficient to exceed the repose angle of the material stored within the tank so that it is readily discharged from the tank and from the filter system at the real of the tank and filter system.

The storage tank and separation system comprises a tank 20 which is of circular cylindrical shape extending from a forward end 21 at the cylinder 19 to a rearward end 22 at which is located a discharge door 23.

The vacuum system further includes an inlet hose 25 which has a rigid front portion 24 mounted on a boom 27 for movement from place to place to effect lifting of the material 13. The hose 25 extends to an inlet opening 26 on the top wall of the tank 20 at a position generally mid-way along the length of the tank so that air carried along the hose 25 carries the material 13, 13A in suspension within the airflow until the air enters the storage tank 20 at the inlet opening 26 at which time the velocity in the air is dramatically decreased allowing the transported material to be discharged or dumped from the airflow and deposited in the base of the storage tank. In the embodiment shown the inlet merely discharges into the open tank with no cyclone or baffles so that the whole of the area underneath the inlet in the top wall is available for storage of the collected materials. However various baffle arrangements or cyclones may be used within the storage tank to effect extraction of as much as possible of the particles and moisture from the air.

The air is drawn out of the storage tank through two outlets 28, 28A at an outlet opening 29, 29A. A duct 40 communicates the extracted air from the outlets 28, 28A to the vacuum pump 15. The extraction of solids and liquid from the air by simply discharging into the tank at the inlet 26 is generally sufficient to remove enough materials from the air to allow the air to pass through the vacuum pump.

Figure 2:
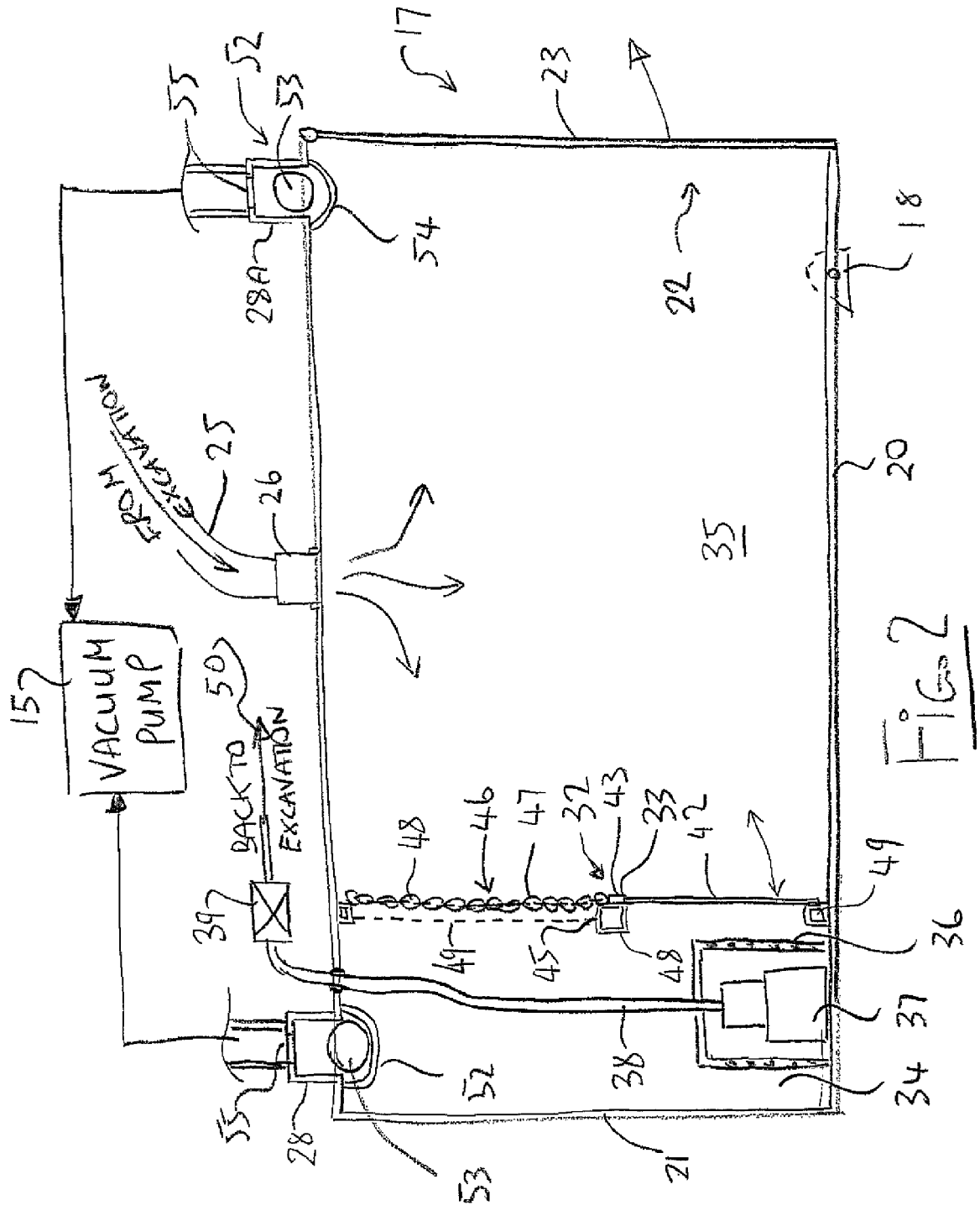
FIG. 2 is a cross sectional view longitudinally of the tank along the lines 2-2 of FIG. 1 showing the construction of the separation system within the tank.
Figure 3:
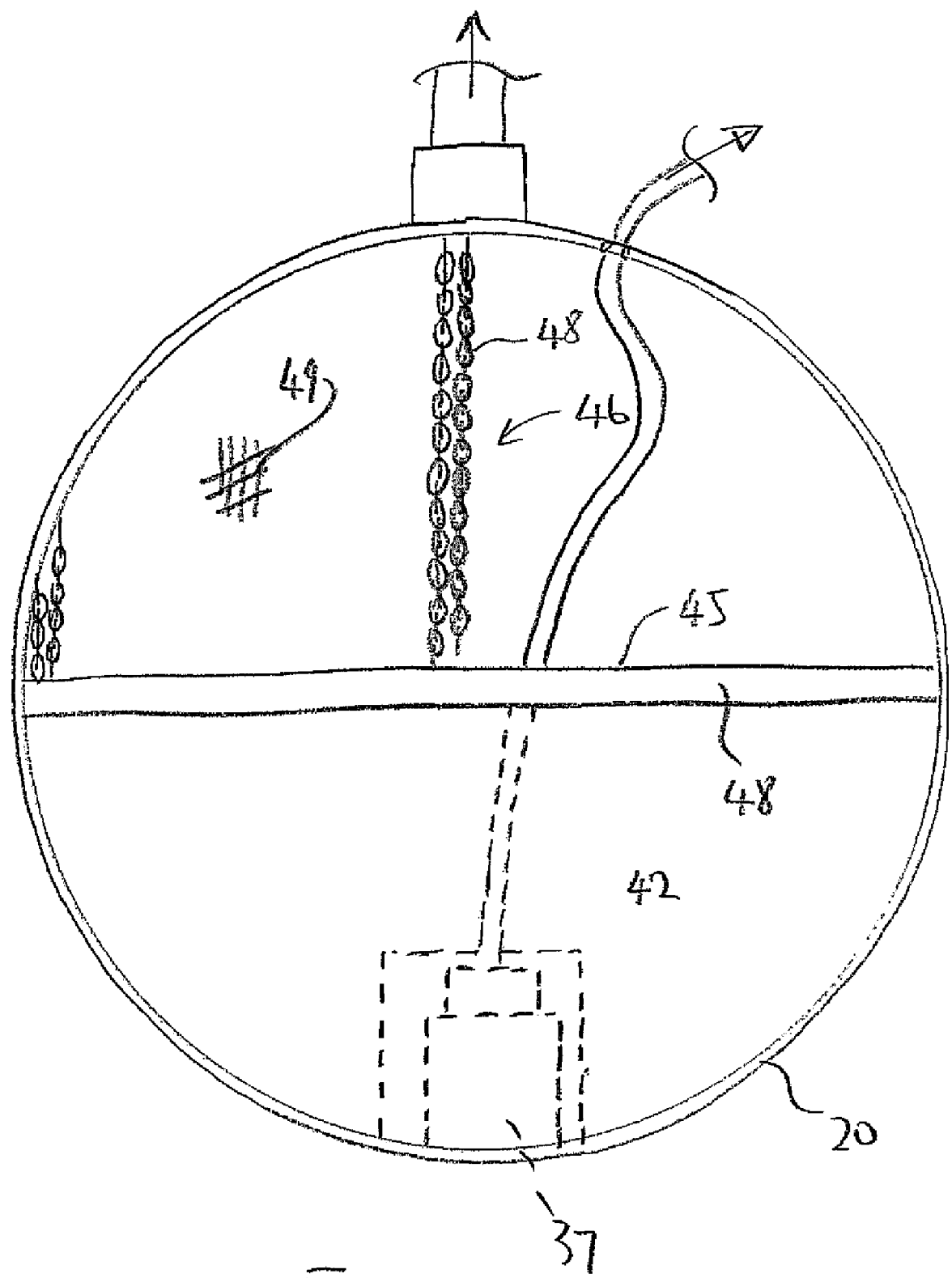
FIG. 3 is a cross sectional view transversely of the tank along the lines 3-3 of FIG. 1 showing the construction of the separation system within the tank and showing only a limited number of the chains for convenience of illustration.

Turning now to FIGS. 2 and 3, the tank 20 includes a separation system therein generally indicated at 32 for separating the materials generally into a liquid component and a solids component. The separation system 32 includes a generally upstanding dividing wall 33 across the tank dividing a solids collection area 34 on one side from a liquid collection area 35 on the other side. The solids collection area 35 is located adjacent the discharge door 23 so that the materials therein can be dumped with the tank is tilted. The tank inlet 26 is located in the solids collection area approximately at a mid point therealong in the top wall so that the vacuumed material including the water and solids is dropped into the solids collection area. The liquid collection area is smaller and reduced to a minimum so as to maximize the storage volume defined by the solids collection area.

A liquid pump 37 is mounted in the tank with the pump having an inlet located in the liquid collection area for extracting the liquid component from the tank to increase a storage capacity of the tank for the solids component to be collected and transported in the tank on the truck to a remote location for discharge. In the embodiment shown, the pump is a submersible pump located in the area 34 and surrounded by a cage 36 to allow the extraction into the pump only of the liquid which is to be returned through an outlet pipe. However other types of pump can be used with the function of extracting the water from the area 34. The separation of the liquid or water from the solids is carried out primarily by the dividing wall 33 which has a bottom wall portion 42, which is substantially imperforate and has a top edge 43 at or adjacent a weir 45 over which liquid can flow into the liquid collection area. The bottom wall portion 42 has a horizontal top edge and a semi-circular bottom edge matching the curvature of the tank so that the bottom wall portion substantially closes the tank below the weir 45. In the embodiment shown the top edge 43 is carried on a transverse rail 48 which provide structural strength. However the rail 48 may be omitted and the portion 42 mounted on hinges at the sides with the top edge 43 defining the weir 45.

The dividing wall 33 has an upper screening section 46 above the weir, which extends from the top edge to the top wall of the tank and is perforated to allow the liquid to pass over the weir 45 into the liquid collection area while restricting passage of the solids.

The upper screening section 46 includes a hanging curtain 47 covering the whole of the upper part of the tank and formed by a series of side by side lengths of chain 48 which are connected to the tank only at a top end so that the other end of each length is free and the length is suspended vertically with the other end of the lengths in contact with or closely adjacent the top edge 43 of the bottom wall portion or the rail. Only some of the chains are shown for convenience. The upper screening section further includes a perforated screen support or mesh 49 on the side of the curtain which is within the liquid collection area to prevent the curtain from being forced into the liquid collection area by the weight of collection of solids within the solids collection area.

The bottom wall portion is pivotally mounted on the rail 48 for pivotal movement about a horizontal axis at or adjacent the top edge 43. Thus the bottom wall portion will pivot to the right as shown in FIG. 2 in response to the tilting of the tank. The bottom wall portion reaches substantially to the bottom wall of the tank so that when it opens the tank is open underneath the rail 48 such that substantially all material at the bottom wall can discharge when the tank is tilted.

A stop 49 is provided to butt the left side of the portion 42 at the bottom to prevent pivotal movement of the bottom wall portion to the left that is in a direction into the liquid collection area caused by weight of solids collected in the solids collection area and pressing against the bottom wall portion.

The liquid pump 37 has its inlet mounted in the liquid collection area below the top edge so that the water falling over the weir collects in that area and is pumped out from the tank to the discharge at a suitable pipe 50 from which it can be returned to the area being cleared of the blockage. In this way only, or primarily, the solids are collected and removed.

The tank extraction outlets 28 and 28A and the tank inlet 26 are all mounted at the top of the tank so as to allow the tank to be filled substantially to the top. The first tank extraction outlet 28 is located at the front of the tank in the liquid collection area and the second tank extraction outlet 28A is located in the solids collection area. In this way the air continues to leave the tank even when the tank is filled at one end. In this way the diverging air from the inlet moving to the two extraction outlets acts to drop the materials from the air stream into the tank acting to load the solids collection area 35 relatively evenly thus maximizing the amount of material contained.

Each tank extraction outlet 28, 28A includes a float valve 52 comprising a float ball 53 contained in a cage 54 formed from row of chains hanging from the top of the tank. The ball is free to be floated upwardly by liquid in the tank when full to engage a valve seat 55 to prevent passage of liquid into the duct to the vacuum pump. The valve seat is located in a receptacle 56 for the float ball 53 located above the top wall of the tank and connected to the duct 28, 28A so as to allow the ball to float up above the top wall to the closed position thus allowing the tank to be filled substantially completely to the top wall.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A vacuum truck comprising:
   a truck frame mounted on ground wheels;
   a vacuum pump mounted on the truck frame for generating an air flow through the pump to form a vacuum inlet on one side of the pump and an air outlet on an opposed side of the pump;
   a vacuum hose having an inlet nozzle for communicating air flow from a material to be vacuumed to carry the material in the air flow to a hose outlet;
   a storage tank having a tank inlet connected to the hose outlet of the vacuum hose for receiving the material carried in the air flow;
   at least one tank extraction outlet connected by a duct to the vacuum inlet of the pump such that air flow is drawn from the tank by the vacuum pump through the duct which generates the air flow in the vacuum hose to carry the material;
   the tank being arranged such that the materials carried in the airflow are discharged from the airflow as the airflow passes through the tank from the vacuum hose to the tank extraction outlet;
   the tank including a separation system therein for separating the materials generally into a liquid component and a solids component;
   a liquid pump mounted in the tank for extracting the separated liquid component from the tank to increase a storage capacity of the tank for the solids component to be collected and transported in the tank on the truck to a remote location for discharge;
   a discharge door at one end of the tank for discharging the collected solids component;
   a lifting arrangement for tilting the tank so as to discharge the collected solids component through the discharge door;
   the separation system including a generally upstanding dividing wall across the tank dividing a solids collection area on one side from a liquid collection area on the other side, with the solids collection area being located adjacent the discharge door, with the water pump having an inlet located in the liquid collection area and with the tank inlet located in the solids collection area;
   the dividing wall having a bottom wall portion, which is substantially imperforate and has a top edge at or adjacent a weir over which liquid can flow into the liquid collection area;
   the dividing wall having an upper screening section, which is perforated to allow the liquid to pass over the top edge into the liquid collection area while restricting passage of the solids;
   wherein the upper screening section includes a hanging curtain formed by a series of side by side lengths of chain.

2. The vacuum truck according to claim 1 wherein the upper screening section extends from the top edge to a top wall of the tank.

3. The vacuum truck according to claim 1 wherein the lengths are connected to only at a top end so that the other end of each length is free and the length is suspended vertically with the other end of the lengths in contact with or closely adjacent the top edge of the bottom wall portion.

4. The vacuum truck according to claim 1 wherein the bottom wall portion is mounted for pivotal movement so as to pivot during tilting of the tank to allow discharge of materials collected at a bottom of the liquid collection area.

5. The vacuum truck according to claim 4 wherein the bottom wall portion is pivotal about a horizontal axis at or adjacent the top edge.

6. The vacuum truck according to claim 4 wherein the bottom wall portion reaches substantially to a bottom wall of the tank such that substantially all material at the bottom wall can discharge when the tank is tilted.

7. The vacuum truck according to claim 4 wherein there is provided a stop to prevent pivotal movement of the bottom wall portion in a direction into the liquid collection area caused by weight of solids collected in the solids collection area.

8. The vacuum truck according to claim 1 wherein the liquid pump is a submersible pump mounted in the liquid collection area below the top edge.

9. The vacuum truck according to claim 1 wherein said at least one tank extraction outlet and the tank inlet are mounted at a top of the tank so as to allow the tank to be filled substantially to the top.

10. The vacuum truck according to claim 1 wherein said at least one tank extraction outlet includes a first tank extraction outlet in the liquid collection area and a second tank extraction outlet in the solids collection area.

11. The vacuum truck according to claim 10 wherein the first tank extraction outlet is mounted at an end of the tank remote from the discharge door and the second tank extraction outlet is mounted at the end of the tank adjacent the discharge door.

12. The vacuum truck according to claim 1 wherein said at least one tank extraction outlet includes a float valve comprising a float ball contained in a cage which is free to be floated upwardly by liquid to engage a valve seat to prevent passage of liquid into the duct to the vacuum pump and wherein the valve seat is located in a receptacle for the float ball located above a top wall of the tank so as to allow the tank to be filled substantially to the top wall.

13. The vacuum truck according to claim 12 wherein the cage for the float ball is formed from row of chains.

14. A vacuum truck comprising:
    a truck frame mounted on ground wheels;
    a vacuum pump mounted on the truck frame for generating an air flow through the pump to form a vacuum inlet on one side of the pump and an air outlet on an opposed side of the pump;
    a vacuum hose having an inlet nozzle for communicating air flow from a material to be vacuumed to carry the material in the air flow to a hose outlet;
    a storage tank having a tank inlet connected to the hose outlet of the vacuum hose for receiving the material carried in the air flow;
    at least one tank extraction outlet connected by a duct to the vacuum inlet of the pump such that air flow is drawn from the tank by the vacuum pump through the duct which generates the air flow in the vacuum hose to carry the material;

the tank being arranged such that the materials carried in the airflow are discharged from the airflow as the airflow passes through the tank from the vacuum hose to the tank extraction outlet;

the tank including a separation system therein for separating the materials generally into a liquid component and a solids component;

a liquid pump mounted in the tank for extracting the separated liquid component from the tank to increase a storage capacity of the tank for the solids component to be collected and transported in the tank on the truck to a remote location for discharge;

a discharge door at one end of the tank for discharging the collected solids component;

a lifting arrangement for tilting the tank so as to discharge the collected solids component through the discharge door;

the separation system including a generally upstanding dividing wall across the tank dividing a solids collection area on one side from a liquid collection area on the other side, with the solids collection area being located adjacent the discharge door, with the water pump having an inlet located in the liquid collection area and with the tank inlet located in the solids collection area;

the dividing wall having a bottom wall portion, which is substantially imperforate and has a top edge at or adjacent a weir over which liquid can flow into the liquid collection area;

the dividing wall having an upper screening section, which is perforated to allow the liquid to pass over the top edge into the liquid collection area while restricting passage of the solids;

wherein the upper screening section includes a hanging curtain formed by a series of side by side lengths of chain;

and wherein the upper screening section includes perforated screen support on the side of the curtain which is within the liquid collection area to prevent the curtain from being forced into the liquid collection area by collection of solids within the solids collection area.

15. The vacuum truck according to claim 14 wherein the lengths are connected to only at a top end so that the other end of each length is free and the length is suspended vertically with the other end of the lengths in contact with or closely adjacent the top edge of the bottom wall portion.

16. The vacuum truck according to claim 14 wherein the bottom wall portion is mounted for pivotal movement about a horizontal axis at or adjacent the top edge so as to pivot during tilting of the tank to allow discharge of materials collected at a bottom of the liquid collection area.

17. The vacuum truck according to claim 16 wherein there is provided a stop to prevent pivotal movement of the bottom wall portion in a direction into the liquid collection area caused by weight of solids collected in the solids collection area.

18. The vacuum truck according to claim 14 wherein the liquid pump is a submersible pump mounted in the liquid collection area below the top edge.

19. The vacuum truck according to claim 14 wherein said at least one tank extraction outlet and the tank inlet are mounted at a top of the tank so as to allow the tank to be filled substantially to the top.

20. The vacuum truck according to claim 14 wherein said at least one tank extraction outlet includes a first tank extraction outlet in the liquid collection area at an end of the tank remote from the discharge door and a second tank extraction outlet in the solid collection area at the end of the tank adjacent the discharge door.

21. The vacuum truck according to claim 14 wherein said at least one tank extraction outlet includes a float valve comprising a float ball contained in a cage formed from row of chains which is free to be floated upwardly by liquid to engage a valve seat to prevent passage of liquid into the duct to the vacuum pump arid wherein the valve seat is located in a receptacle for the float ball located above a top wall of the tank so as to allow the tank to be filled substantially to the top wall.

* * * * *